US008626389B2

(12) United States Patent
Sidlosky (10) Patent No.: US 8,626,389 B2
(45) Date of Patent: Jan. 7, 2014

(54) METHOD AND SYSTEM FOR DETERMINING A REFERENCE YAW RATE FOR A VEHICLE

(75) Inventor: David M. Sidlosky, Beverly Hills, MI (US)

(73) Assignee: GM Global Technology Operations LLC, Detroit, MI (US)

(*) Notice: Subject to any disclaimer, the term of this patent is extended or adjusted under 35 U.S.C. 154(b) by 596 days.

(21) Appl. No.: 12/914,715

(22) Filed: Oct. 28, 2010

(65) Prior Publication Data

US 2012/0109458 A1  May 3, 2012

(51) Int. Cl.
*A01B 69/00* (2006.01)
*B62D 6/00* (2006.01)
*B62D 5/04* (2006.01)

(52) U.S. Cl.
USPC ............... 701/41; 701/42; 180/443; 180/446

(58) Field of Classification Search
USPC .......................... 701/41, 42; 180/443, 446
See application file for complete search history.

(56) References Cited

U.S. PATENT DOCUMENTS

| 5,941,919 | A | | 8/1999 | Pastor et al. |
| 6,161,905 | A | * | 12/2000 | Hac et al. ............... 303/146 |
| 6,804,594 | B1 | * | 10/2004 | Chen et al. ............... 701/42 |
| 6,931,313 | B2 | * | 8/2005 | Kato et al. ............... 701/41 |
| 8,073,607 | B2 | * | 12/2011 | Sidlosky et al. ............... 701/82 |
| 2005/0043874 | A1 | * | 2/2005 | Chen et al. ............... 701/42 |
| 2005/0096799 | A1 | * | 5/2005 | Boswell et al. ............... 701/1 |
| 2009/0182476 | A1 | | 7/2009 | Sidlosky et al. |

OTHER PUBLICATIONS

Lippmann; S.A., et al. "Lateral Forces of Passenger Tires and Effects on Vehicle Response During Dynamic Steering", Society of Automotive Engineers, Feb. 23-27, 1976, 20 pages, Automotive Engineering Congress and Exposition, Detroit, Michigan.

Loeb; Jeff S., et al. "Lateral Stiffness, Cornering Stiffness and Relaxation Length of the Pneumatic Tire", SAE Technical Paper Series, Feb. 26-Mar. 2, 1990, 10 pages, International Congress and Exposition, Detroit, Michigan.

* cited by examiner

*Primary Examiner* — Thomas Black
*Assistant Examiner* — Tyler Paige
(74) *Attorney, Agent, or Firm* — Lionel D. Anderson; Reising Ethington P.C.

(57) ABSTRACT

The method and system described herein may be used to determine a reference yaw rate ($\gamma_{ref}$) for a vehicle chassis control system, and may do so across a wide spectrum of vehicle operating conditions. These conditions may include, for example, when the vehicle is being driven: at low and high vehicle speeds, in forward and reverse directions, with front-, rear- and all-wheel steering systems, according to subtle and aggressive driving maneuvers, and on roads with flat or banked surfaces, to cite a few of the potential scenarios. According to an exemplary embodiment, the method and system take into account certain tire dynamics, such as the relaxation length ($\lambda$) of the tires, when estimating the reference yaw rate ($\gamma_{ref}$). Once an accurate reference yaw rate ($\gamma_{ref}$) is determined, the vehicle chassis control system may use this estimate to control one or more actuators that can influence the yaw rate of the vehicle. Some non-limiting examples of systems that may include such actuators are chassis systems, brake systems, steering systems, suspension systems, safety systems, stability control systems, traction control systems, torque control systems, or any other system that can affect the vehicle yaw rate. It is also possible for the method and system described herein to determine a reference lateral velocity ($V_{yref}$) for the vehicle as well.

24 Claims, 3 Drawing Sheets

METHOD AND SYSTEM FOR DETERMINING A REFERENCE YAW RATE FOR A VEHICLE

TECHNICAL FIELD

The present invention generally relates to a vehicle control system and, more particularly, to a method and system for determining a reference yaw rate ($\gamma_{ref}$) for a vehicle chassis control system.

BACKGROUND

Traditionally, vehicle chassis control systems utilize a variety of data and information from around the vehicle, including yaw rate, to control one or more aspects of vehicle operation. For example, a vehicle chassis control system may be used in conjunction with a brake system to modulate brake force during stops and provide anti-lock brake control (ABS) and/or to modulate brake force during acceleration and provide improved traction control (TCS). These are, of course, only some of the ways in which a vehicle chassis control system may work with other systems to improve the operational performance of the vehicle.

SUMMARY

According to one embodiment, there is provided a method for determining a reference yaw rate ($\gamma_{ref}$) for a vehicle. The method may comprise the steps of: (a) determining a steering angle ($\delta$); (b) determining a longitudinal velocity ($V_x$); and (c) using the steering angle ($\delta$), the longitudinal velocity ($V_x$), and one or more tire dynamic(s) to determine the reference yaw rate ($\gamma_{ref}$) for the vehicle.

According to another embodiment, there is provided a method for determining a reference yaw rate ($\gamma_{ref}$) for a vehicle. The method may comprise the steps of: (a) using a steering angle ($\delta$) and a longitudinal velocity ($V_x$) to determine a slip angle ($\alpha$); (b) using the slip angle ($\alpha$) and one or more tire dynamic(s) to determine a lateral force ($F_y$) as a function of time; (c) using the lateral force ($F_y$) as a function of time and the longitudinal velocity of the vehicle ($V_x$) to determine a yaw rate derivative $\dot{\gamma}$; and (d) integrating the yaw rate derivative $\dot{\gamma}$ to determine the reference yaw rate ($\gamma_{ref}$).

According to another embodiment, there is provided a chassis control system for a vehicle that may comprise a steering sensor, one or more vehicle speed sensor(s), a control unit, and one or more actuator(s). The steering sensor provides a steering signal that is representative of a steering angle ($\delta$). The vehicle speed sensor(s) provide a vehicle speed signal that is representative of a longitudinal velocity ($V_x$). The control unit receives the steering signal from the steering sensor and the vehicle speed signal from the vehicle speed sensor(s), and provides a yaw rate control signal. And the actuator(s) receive the yaw rate control signal from the control unit, and use the yaw rate control signal to influence the yaw rate of the vehicle.

BRIEF DESCRIPTION OF THE DRAWINGS

Preferred exemplary embodiments will hereinafter be described in conjunction with the appended drawings, wherein like designations denote like elements, and wherein.

DETAILED DESCRIPTION OF THE EMBODIMENTS

The method and system described herein may be used to determine a reference yaw rate ($\gamma_{ref}$) for a vehicle chassis control system, and may do so across a wide spectrum of vehicle operating conditions. These conditions may include, for example, when the vehicle is being driven: at low and high vehicle speeds, in forward and reverse directions, with front-, rear- and all-wheel steering systems, according to subtle and aggressive driving maneuvers, and on roads with flat or banked surfaces, to cite a few of the potential scenarios. According to an exemplary embodiment, the method and system take into account certain tire dynamics, such as the relaxation length ($\lambda$) of the tires, when estimating the reference yaw rate ($\gamma_{ref}$). Once an accurate reference yaw rate ($\gamma_{ref}$) is determined, the vehicle chassis control system may use this estimate to control one or more actuators that can influence the yaw rate of the vehicle. Some non-limiting examples of systems that may include such actuators are chassis systems, brake systems, steering systems, suspension systems, stability control systems, traction control systems, torque control systems, or any other system that can affect vehicle yaw rate. The reference yaw rate ($\gamma_{ref}$) may also be employed in active safety systems in determining the driver's intended vehicle path. It is also possible for the method and system described herein to determine a reference lateral velocity ($V_{yref}$) for the vehicle.

Figure 1:
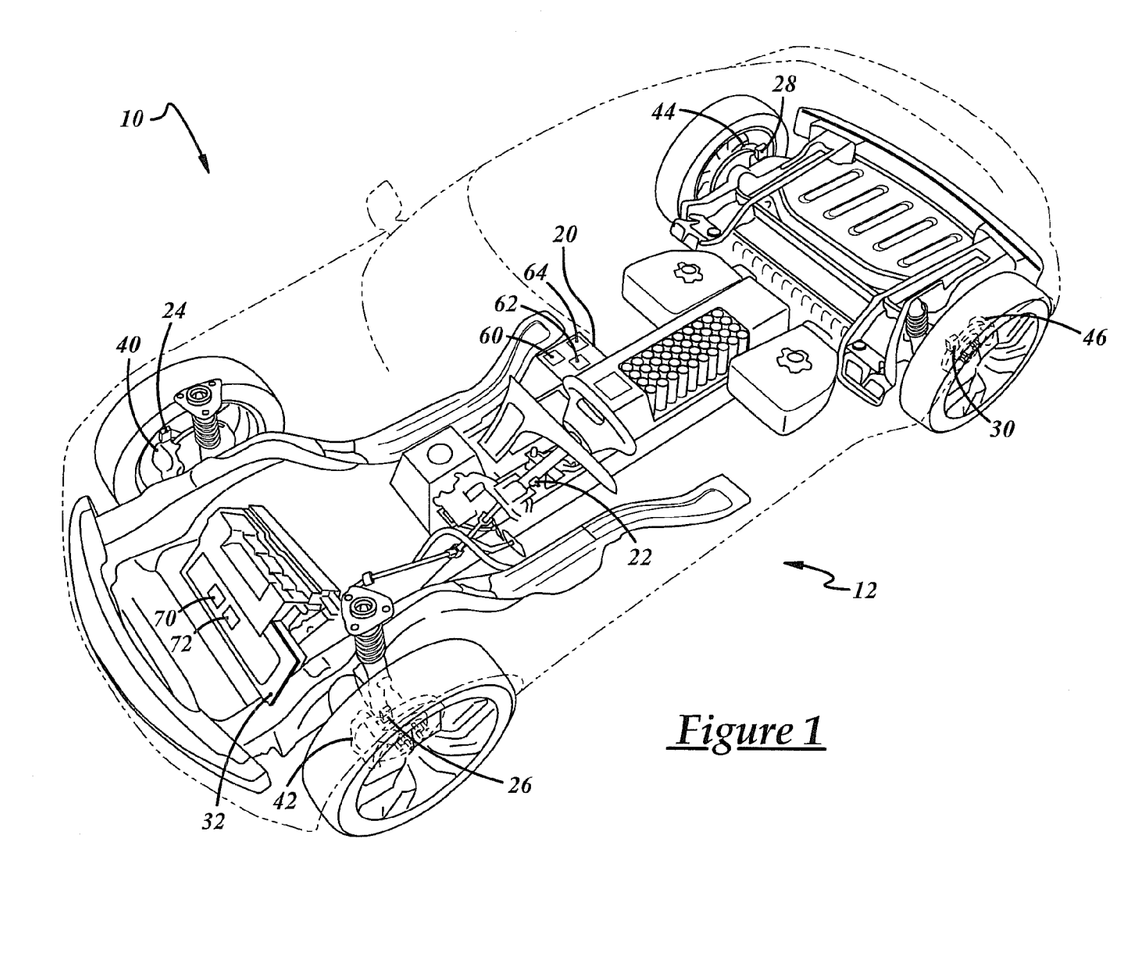
FIG. 1 is a perspective view of an exemplary vehicle, including a chassis control system, that may utilize the method described herein.

With reference to FIG. 1, there are shown portions of an exemplary vehicle 10 having a chassis control system 12 that may be used to determine and utilize a reference yaw rate ($\gamma_{ref}$) and a reference lateral velocity ($V_{yref}$). It should be appreciated that FIG. 1 is only a general and schematic representation of one potential vehicle and chassis control system, and that the present method could be used with any number of different vehicles and systems and is not limited to the exemplary ones shown here. For example, the method and system described below may be used with a wide variety of vehicles, including a non-hybrid vehicle, a hybrid electric vehicle (HEV) like the one in FIG. 1, a plug-in hybrid electric vehicle (PHEV), and a battery electric vehicle (BEV), to cite a few possibilities. According to this particular embodiment, chassis control system 12 generally includes a vehicle dynamics sensor unit 20, a steering wheel sensor 22, vehicle speed sensors 24-30, a control unit 32, and brake units 40-46.

Any number of different sensors, components, devices, modules, subsystems, systems, etc. may provide chassis control system 12 with information or input that could be used with the present method. These include, for example, the exemplary sensors shown in FIG. 1, as well as others that are known in the art but are not shown here. It should be appreciated that the sensors of vehicle dynamics sensor unit 20, steering wheel sensor 22, vehicle speed sensors 24-30, as well as any other sensor located in and/or used by chassis control system 12 may be embodied in hardware, software, firmware or some combination thereof. These sensors may directly sense or evaluate the conditions for which they are provided, or they may indirectly evaluate such conditions based on information provided by other sensors, components, devices, modules, subsystems, systems, etc. Furthermore, these sensors may be directly coupled to control unit 32, indirectly coupled via other electronic devices, coupled over a vehicle communications bus, network, etc., or coupled according to some other arrangement known in the art. In addition, these sensors may be integrated within a vehicle component, device, module, subsystem, system, etc. (e.g., sensors provided within an antilock brake system (ABS) module, an energy management system, etc.), they may be stand-alone components (as schematically shown in FIG. 1), or they may be provided according to some other arrangement. It is possible for any one of the sensor signals described below to be provided by some suitable device, module, system, etc. in the vehicle instead of being directly provided by an actual sensor element. These are only some of the possibilities, as any type of sensor or sensor arrangement known in the art could also be used.

Vehicle dynamics sensor unit 20 may include any combination of sensors or sensing elements that detect or measure vehicle dynamics, and may be packaged separately or in a single unit. According to one exemplary embodiment, vehicle dynamics sensor unit 20 is an integrated inertial sensor measurement unit (IMU) that includes a yaw rate sensor 60, a lateral acceleration sensor 62, and a longitudinal acceleration sensor 64 all packaged together, and is mounted inside of the vehicle cabin. The preferred location is at or near the vehicle center of gravity, since the vehicle will rotate about this point when operated on a uniform surface. Another potential location for mounting vehicle dynamics sensor unit 20 is under the passenger seat, but other locations are possible as well. If the dynamics sensor unit 20 is not located at the center of gravity, then the longitudinal and lateral acceleration measurements can be compensated through the use of appropriate offsets, as is appreciated by those skilled in the art.

Yaw rate sensor 60 provides chassis control system 12 with a yaw rate signal that is generally representative of the angular velocity or speed of the vehicle around a vertical axis; i.e., the vehicle yaw rate. Yaw rate sensor 60 may be a standalone sensor, as opposed to being integrated within the same housing as acceleration sensors 62 and 64, and it may provide devices other than control unit 32 with information. For example, an antilock brake system (ABS) and a vehicle electronic stability control (ESC) system may use information from yaw rate sensor 60. Some exemplary technologies that may be used with yaw rate sensor 60 include piezoelectric-type sensors, micromechanical-type sensors and gyroscopes, all of which are known to those skilled in the art. Any type of suitable yaw rate sensor may be used here, including those that directly sense or measure the vehicle's yaw rate, along with those that calculate or deduce the yaw rate from other data, measurements, readings, etc.

Lateral acceleration sensor 62 provides chassis control system 12 with a lateral acceleration signal that is generally representative of the lateral acceleration of the vehicle. Lateral acceleration is sometimes noticeable as a centrifugal force moving a vehicle to the outside of a curve when a vehicle is cornering. In one embodiment, lateral acceleration sensor 62 includes a lateral accelerometer that is co-located in the same housing as yaw rate sensor 60 or is integrated together as one unit. Some examples of suitable acceleration sensor types include microelectromechanical system (MEMS) type sensors and tuning fork-type sensors, although any type of acceleration sensor may be used. Depending on the particular needs of the system, lateral acceleration sensor 62 may be a single- or multi-axis sensor, may detect acceleration and/or deceleration, may detect the magnitude and/or the direction of the acceleration as a vector quantity, may sense or measure acceleration directly, or may calculate or deduce acceleration from other readings like vehicle speed readings, to cite a few possibilities.

Longitudinal acceleration sensor 64 provides chassis control system 12 with a longitudinal acceleration signal that is generally representative of the longitudinal acceleration of the vehicle. Longitudinal acceleration refers to the component of vehicle acceleration that is parallel to its longitudinal axis. In one embodiment, longitudinal acceleration sensor 64 includes a longitudinal accelerometer that is co-located in the same housing as yaw rate sensor 60 or is integrated together as one unit. Some examples of suitable acceleration sensor types include microelectromechanical system (MEMS) type sensors and tuning fork-type sensors, although any type of acceleration sensor may be used. Depending on the particular needs of the system, longitudinal acceleration sensor 64 may be single- or multi-axis sensors, may detect acceleration and/or deceleration, may detect the magnitude and/or the direction of the acceleration as a vector quantity, may sense or measure acceleration directly, or may calculate or deduce acceleration from other readings, to cite a few possibilities. It is also possible for the longitudinal acceleration of the vehicle to be determined from the readings provided by vehicle speed sensors 24-30.

Steering sensor 22 provides chassis control system 12 with a steering signal that is generally representative of the angular orientation, position, movement and/or state of one or more of the vehicle's wheels. Any number of different types of steering sensors may be used, including those that measure both front and rear steering angles, those that are located out at the corners of the vehicle and are coupled directly to the vehicle wheels, those that are coupled to a steering wheel, a steering shaft, a pinion gear or some other steering system component, or those that are part of some other vehicle system like a steer-by-wire system or an anti-lock brake system (ABS). Steering sensor 22 may be a digital sensor that provides a steering signal with a digital position reading where movement of the steering wheel in one direction results in incrementing the position reading, while movement in the other direction results in decrementing the position reading. In another embodiment, steering sensor 22 may be an analog sensor (e.g., a resistive rotary device) that provides a steering signal in analog form. Examples of steering sensors that may be used are described U.S. Pat. No. 5,941,919, although other types and/or combinations of sensors can be used as well. In an exemplary embodiment, steering sensor 22 includes a sensor element that is coupled to a front steering actuator and determines a front steering angle ($\delta_f$) and a sensor element that is coupled to a rear steering actuator and determines a rear steering angle ($\delta_r$), so that method 100 may provide a reference yaw rate ($\gamma_{ref}$) for a vehicle that has steerable front and rear wheels.

Vehicle speed sensors 24-30 provide chassis control system 12 with speed signals that are indicative of the rotational speed or velocity of the wheels, and hence the overall velocity of the vehicle. A variety of different speed sensors and sensing techniques may be used, including those that use rotational wheel speed, ground speed, accelerator pedal position, clutch pedal position, gear shifter selection, vehicle acceleration, engine speed, engine torque, and throttle valve position, to name a few. In one embodiment, individual wheel speed sensors 24-30 are coupled to each of the vehicle's four wheels and separately report the rotational velocity of the four wheels. Skilled artisans will appreciate that these sensors may operate according to optical, electromagnetic or other technologies, and that vehicle speed sensors 24-30 are not limited to any particular speed sensor type. In another embodiment, speed sensors could be coupled to certain parts of the vehicle, such as an output shaft of the transmission or behind the speedometer, and produce speed signals from these measurements. It is also possible to derive or calculate speed signals from acceleration signals, such as those mentioned above (skilled artisans appreciate the relationship between velocity and acceleration readings). In another embodiment, one or more speed sensors could determine vehicle speed relative to the ground by directing radar, laser or other signals towards the ground and analyzing the reflected signals. It is possible for the speed signals to be provided to chassis control system 12 by some other module, subsystem, system, etc., like an antilock braking system (ABS) module.

Control unit 32 may include any combination of electronic processing devices, memory devices, input/output (I/O) devices, and/or other known components, and may perform various control and/or communication related functions. In an exemplary embodiment, control unit 32 includes an electronic memory device 70 and an electronic processing device 72. Depending on the particular embodiment, control unit 32 may be a single standalone unit or module, it may be incorporated or included within one or more other electronic modules or systems, it may be part of a larger network or system (e.g., a stability control system), or it could embody a combination of these arrangements, to name a few possibilities. Some examples of potential implementations of control unit 32 include a chassis control module, a brake control module, an active steering control module, an active suspension control module, an active differential control module, a safety control module, a stability control module, a traction control module, a torque control module, or any other device, module, system, etc. that can control or otherwise affect the yaw rate of the vehicle. The present method is not limited to any particular embodiment.

Electronic memory device 70 may include any type of suitable electronic memory means and may store a variety of data, information and/or electronic instructions. This includes, for example, sensed vehicle conditions (e.g., those provided by sensors 20-30), look-up tables and other data structures, algorithms (e.g., electronic instructions used to implement the method described below), vehicle component characteristics and background information (e.g., operational settings, etc. for the different vehicle components), etc. The method described below—as well as any combination of electronic instructions and information needed to perform such an algorithm—may be stored or otherwise maintained in memory device 70 of control unit 32.

Electronic processing device 72 may include any type of suitable electronic processor (e.g., a microprocessor, a microcontroller, an application specific integrated circuit (ASIC), etc.) that executes electronic instructions for software, firmware, programs, algorithms, scripts, etc. The exemplary processing device 72 is not limited to any one type of component or device. Control unit 32 may be electronically connected to other vehicle devices, modules, systems, etc. via a suitable connection and can interact with them as required. These are, of course, only some of the possible arrangements, functions and capabilities of control unit 32, as others are certainly possible.

Control unit 32 may continuously monitor vehicle dynamics, like steering and vehicle direction, during normal driving and operate in the background without much intervention that is noticeable to the driver. For example, a chassis control module may compare the driver's intended direction (e.g., that obtained from steering sensor 22) to the actual direction of the vehicle, and then take one of a number of corrective measures to improve the stability of the vehicle. Such measures may include adjustments to braking, steering, suspension, differentials, power distribution, power generation, etc. Even though control unit 34 is referred to here as a chassis control module, other modules and systems may be used instead, including those referred to as a brake control module, an active steering control module, an active suspension control module, an active differential control module, a safety control module, a stability control module, a traction control module, a torque control module, or any other device, module, system, etc. that can control or otherwise affect the yaw rate of the vehicle.

Brake units 40-46 are each located at a vehicle wheel or corner and can generate a braking torque to counteract the forward momentum of vehicle 10. According to one embodiment, each of the brake units 40-46 includes a rotor, brake piston, caliper, and brake pads and may be part of an electro-hydraulic braking (EHB) system, an electro-mechanical braking (EMB) system, or some other type of frictional or non-frictional system. In an EMB system, each brake unit 40-46 may include an electrically driven caliper in place of a hydraulically driven piston. Brake units 40-46 may be controlled together in unison, controlled on an axle-by-axle basis (e.g., front wheels controlled together and rear wheels controlled together), controlled in other groups (e.g., driver side wheels controlled together), controlled on a wheel-by-wheel basis, or controlled according to some other arrangement. The method and system described herein are not limited to use with disk brake systems and could be used with other braking systems and arrangements, including drum brake systems. In another embodiment, regenerative braking torque is created by one or more motors/generators and counteracts the forward momentum of the vehicle through an electromagnetically-derived force that acts against the forward rotation of the wheels and/or other drivetrain components (this process may also charge a high voltage battery). In another embodiment, the vehicle uses a combination of frictional and regenerative braking to control the speed of the vehicle and to generate electrical energy.

Although the exemplary method is described herein in the context of a brake-by-wire system, such as an electro-hydraulic braking (EHB) system or an electro-mechanical braking (EMB) system, it should be appreciated that the method may also be used with any number of other braking systems and is not limited to the disclosed embodiment. For example, the present method may be used with other brake-by-wire and non-brake-by-wire systems, regenerative and non-regenerative braking systems, as well as other brake systems that use other types of technologies. In one embodiment, the present method and system are used with a conventional disk or drum brake system (i.e., a non-brake-by-wire system).

Chassis control system 12 may include more, less or a different combination of elements, components, devices and/or modules than those illustrated and described here, as the present method is not limited to this particular embodiment. For example, exemplary vehicle 10 may include: a charger, an inverter/converter, an engine, one or more motors/generators, a hybrid transmission, a power-split device, a gear box, one or more clutches, a flywheel and/or other hybrid drivetrain components; a low-voltage electrical circuit or bus (e.g., standard 12V, 18V or 42V circuits), a high-voltage electrical circuit or bus, an accessory power module (APM), electronic accessories, different electronic modules, a telematics unit and/or other electronic devices; as well as any other devices that may be found in hybrid and non-hybrid vehicles. Furthermore, the components, devices, modules and/or systems shown in FIG. 1 may be integrated or otherwise combined with other parts of the vehicle, as the illustration in that figure is only meant to generally and schematically illustrate one potential system arrangement. Skilled artisans will appreciate that the reference yaw rate ($\gamma_{ref}$) and/or the reference lateral velocity ($V_{yref}$) described below may be used to control any number of different actuators in the vehicle, including but certainly not limited to actuators that are part of brake units 40-46. Other actuators, such as those that influence steering, suspension, acceleration, deceleration, etc. may be controlled with the reference yaw rate ($\gamma_{ref}$) and/or the reference lateral velocity ($V_{yref}$) as well.

Figure 2:
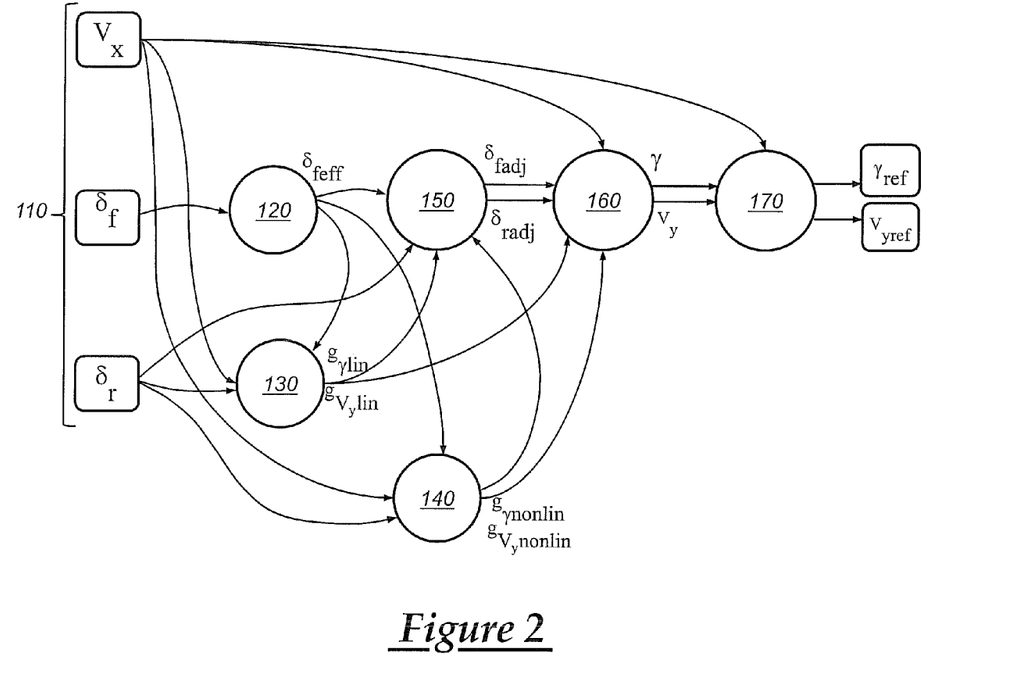
FIG. 2 is a flowchart of an exemplary method that may be used to determine a reference yaw rate ($\gamma_{ref}$) for a vehicle, and the method may be used with the chassis control system of FIG. 1.

Turning now to FIG. 2, there is shown an exemplary method 100 for determining a reference yaw rate ($\gamma_{ref}$) for a vehicle chassis control system. The reference yaw rate ($\gamma_{ref}$) generally corresponds to the ideal or theoretical yaw rate of the vehicle if it was being driven on a high-coefficient surface. Therefore, the reference yaw rate ($\gamma_{ref}$) does not change for a specific vehicle based on road surface. According to an exemplary embodiment, method 100 accurately determines a reference yaw rate ($\gamma_{ref}$) across a wide spectrum of vehicle operating conditions by considering certain tire dynamics such as cornering stiffness (C), relaxation length ($\lambda$) and other characteristics of the vehicle's tires. Once an accurate reference yaw rate ($\gamma_{ref}$) is determined, the vehicle chassis control system may use closed loop control to try and minimize the difference between the reference yaw rate ($\gamma_{ref}$) and an actual or measured yaw rate ($\gamma_{meas}$); this difference in yaw rates is sometimes referred to as the yaw rate error ($\Delta\gamma_{error}$). The yaw rate error ($\Delta\gamma_{error}$) may then be used by vehicle chassis control system 12 to control one or more actuators in the vehicle chassis system (e.g., actuators in brake systems, suspension systems, active safety systems, electronic stability control (ESC) systems, etc.).

As is appreciated by those skilled in the art, most vehicle chassis systems have two operating modes or states: a linear region mode and a non-linear region mode. In the linear region mode (also referred to as a first operating mode), the vehicle generally behaves in a manner such that the yaw rate is substantially linearly related to the steering angle ($\delta$); this is sometimes described in the context of a "yaw gain." Linear region mode operation typically occurs when the lateral acceleration of the vehicle is lower than a certain threshold (e.g., ≤0.4 g for most standard vehicles). In the non-linear region mode (also referred to as a second operating mode), the vehicle generally behaves in a substantially non-linear manner with respect to the steering angle ($\delta$). Certain vehicle operating conditions—for example, when the driver is engaging in aggressive driving maneuvers like slaloming or tight cornering, etc. —may cause the vehicle to operate in the non-linear region mode where the relationship between yaw rate and steering angle is substantially non-linear. The vehicle may transition from a linear region mode to a non-linear region mode when the vehicle tires loose traction and experience some degree of lateral movement across the surface of the road.

Notwithstanding the linear and non-linear regions discussed above, there are two types of non-linear behavior that may affect the reference yaw rate ($\gamma_{ref}$). The first is a non-linear kinematic relationship between road-wheel angle and turn radius, which is addressed by the non-linear correction factor and effective steer angles discussed below. This correction is most important when the steer angle is large and the turn radius is small. The second source of potential non-linearity is understeer. In this case, the relationship between steer angle and lateral acceleration is linear (constant understeer gradient $K_u$) up to a certain lateral acceleration (e.g., about 0.4 g). After that, the value of $K_u$ may rise substantially such that the relationship is no longer linear. $K_u$ as a function of lateral acceleration may be implemented here as a fourth order polynomial or as a lookup table, to cite two possibilities.

As will be explained below, just because an operating mode is "substantially linear" or "substantially non-linear" does not mean that it is entirely or completely linear or non-linear, respectively. For example, there are certain instances when a vehicle in the non-linear region mode behaves in a linear fashion, as described below. The reference yaw rate ($\gamma_{ref}$) determined in method 100 may include or consider a linear region mode component (yaw gain) and/or a non-linear region mode component. Depending on the vehicle operating conditions, the reference yaw rate ($\gamma_{ref}$) may only have a linear region mode component or a non-linear region mode component, or it may include both linear and non-linear region mode components. U.S. Pat. Nos. 5,941,919 and 6,862,506 and U.S. Patent Application Publication No. 2009/0182476 disclose methods for determining one or more aspects or components of a reference yaw rate ($\gamma_{ref}$). All of these documents are assigned to the present assignee and are incorporated herein by reference. The exemplary methods, steps, equations, formulas, etc. that are provided herein for deriving or otherwise determining a reference yaw rate ($\gamma_{ref}$) assume an ISO 8855 coordinate system. It is possible, however, for an alternate coordinate system, such as an SAE coordinate system, to be used instead. In such a case, the signs of some of the terms in some of the equations below should be changed; skilled artisans will appreciate how to adapt the equations of one coordinate system to another.

Method 100 may also determine a reference lateral velocity ($V_{yref}$), which refers to the ideal or theoretical lateral velocity of the vehicle under the same conditions that were used to determine the reference yaw rate ($\gamma_{ref}$). The reference lateral velocity ($V_{yref}$) may be a helpful or useful quantity for vehicle chassis control system 12 and other components, devices, modules and/or systems in the vehicle. However, determining the reference lateral velocity ($V_{yref}$) is optional and is not required of method 100.

Beginning with step 110, the method senses one or more vehicle operating parameter(s). In one embodiment, step 110 gathers or otherwise determines a front steering angle ($\delta_f$), a rear steering angle ($\delta_r$) and a longitudinal velocity ($V_x$), and may do so according to a number of different techniques. For example, the front and/or rear steering angles may be determined by taking measurements of the actual angular alignment of the wheels (i.e., the road wheel angle), by taking angular measurements of a steering system component (e.g., a steering shaft, pinion gear, or rear steering actuator) and calculating a steering angle based on a known steering ratio, or by gathering steering angle data from some other source (e.g., a steering actuator in a steer-by-wire system), to cite a few possibilities. In one embodiment, steering sensor 22 sends control unit 32 a steering signal that is representative of the steering angle of the front and/or rear wheels. The longitudinal velocity ($V_x$) may be determined from one or more vehicle speed sensors 24-30 or from some other source in the vehicle, like a brake control module, that is in possession of such information. It should be appreciated that step 110 is not limited to any particular method or technique for gathering, calculating or otherwise determining vehicle operating parameters, and that such parameters could be acquired from other components, devices, modules and/or systems in the vehicle. It is also possible for step 110 to obtain some other combination of vehicle operating parameters, as it is not limited to the two steering angles and longitudinal velocity discussed above. For instance, if method 100 is used with a vehicle that lacks steerable rear wheels, then step 110 may only obtain a front steering angle ($\delta_f$) or may set the rear steering angle ($\delta_r$) to zero (i.e., "stubbing" out the rear steering input).

In some instances, it may be advantageous to adjust or compensate the steering angle ($\delta$) that was acquired in the last step by determining an effective steering angle ($\delta_{eff}$). For example, in some vehicles there is a non-linear relationship between the steering wheel angle and the road wheel angle (i.e., the actual angle of the wheels); this is sometimes referred to as a non-linear steering response and can be attributable to various kinematic factors. This can be particularly true at large steering angles. If step 110 determines a front steering angle ($\delta_f$) by taking a measurement of the steering wheel or other steering system component and then calculating a steering angle ($\delta$) through a gear ratio—without compensating for the non-linear steering response mentioned above—then the steering angle ($\delta$) calculation can be off. Step 120 addresses this issue.

Step 120 determines an effective steering angle ($\delta_{eff}$) that takes into account factors such as vehicle geometry, vehicle dynamics, etc. and helps provide for a linear steering response. A variety of techniques can be used in step 120 to determine an effective steering angle ($\delta_{eff}$), including using one or more lookup tables derived from actual testing or from kinematic vehicle models that take into account spindle length, suspension characteristics, etc. In one embodiment, step 120 determines an effective steering angle for the front wheels ($\delta_{feff}$) by using a lookup table that is a two-dimensional structure and receives a front steering angle ($\delta_f$) as an input and provides a correction factor or value (e.g., 1-1.2) as an output. Step 120 may then multiply the front steering angle ($\delta_f$) by the correction factor to determine an effective front steering angle ($\delta_{feff}$). By addressing the non-linear steering response at this point, method 100 is able to subsequently use other models and/or make other assumptions that are based on linearity. The following equations may be used to determine a correction factor (K):

$$K = \frac{L\gamma_{meas}}{V_x \delta_f} \quad \text{(Equation 1)}$$

$$\delta_{feff} = K\delta_f \quad \text{(Equation 2)}$$

where K is the correction factor; L is the vehicle wheelbase (m); $\gamma_{meas}$ is the measured yaw rate (radians/sec); $V_x$ is the longitudinal velocity (m/sec); $\delta_f$ is the front steering angle (radians); and $\delta_{feff}$ is the effective front steering angle (radians). An example of a kinematic model that can be used to derive correction value (K) is described in U.S. Patent Application Publication No. 2009/0182476. The correction value (K) can also be derived through test data, where a test vehicle is first driven at a very low speed in a straight line, and then the steering angle is slowly increased until a full lock of the steering wheel is achieved. This is preferably done for both right and left turns, as the steering response may be asymmetric. Determining an effective steering angle ($\delta_{eff}$) is optional and is not required of method 100.

Because rear steer vehicles are generally limited to very small steering angles, if at all, the steering response is usually pretty close to linear. Hence, the yaw rate is nearly proportional to the non-compensated steering angle. If a vehicle were to allow for large rear steering angles, then step 120 could be used to determine an effective rear steering angle ($\delta_{reff}$) as well. It should be appreciated that the term "steering angle ($\delta$)," as used herein, broadly includes all types of steering angles including, but certainly not limited to, front steering angles ($\delta_f$), rear steering angles ($\delta_r$), effective steering angles ($\delta_{eff}$), measured steering angles, calculated steering angles, individual steering angles, combined steering angles, road wheel angles, hand wheel angles, and more.

Next, step 130 determines a linear component (sometimes referred to as the "linear gain") for the reference yaw rate ($\gamma_{ref}$). As mentioned above, most vehicle chassis systems have two operating modes: a linear region mode and a non-linear region mode. In the linear region mode, the vehicle generally behaves in a manner such that the yaw rate ($\gamma$) is substantially linearly related to the steering angle ($\delta$), but this is not true for all situations and all circumstances. Thus, method 100 may improve the accuracy of the reference yaw rate ($\gamma_{ref}$) by considering both a linear component or linear gain ($g\gamma_{lin}$) and a non-linear component or non-linear gain ($g\gamma_{nonlin}$) for the linear region mode. This can be accomplished in a number of different ways. In one embodiment, step 130 assumes that the front and rear cornering stiffnesses of the tires ($C_f$, $C_r$) are constant for low vehicle lateral acceleration (e.g., less than or equal to 0.15 g) and uses the following equations to determine a linear gain ($g\gamma_{lin}$) value.

$$g\gamma lin = \frac{V_x}{L + K_u V_x^2 \text{sgn}(V_x)} \quad \text{(Equation 3)}$$

where $V_x$ is the vehicle longitudinal velocity (m/sec); L is the vehicle wheel base (m); and $K_u$ is the understeer gradient (radian/g). The understeer gradient ($K_u$), in turn, can be determined using the expression:

$$K_u = \frac{M}{L}\left(\frac{bC_r - aC_f}{C_f C_r}\right) \quad \text{(Equation 4)}$$

where m is the total vehicle mass (kg); a is the distance from center of gravity to front axle (m); b is the distance from center of gravity to rear axle (m); $C_f$ is the front cornering stiffness (N/radian); and $C_r$ is the rear cornering stiffness (N/radian). When the understeer gradient ($K_u$) is not constant, then the method may employ a suitable recursive solution. Skilled artisans will appreciate that the understeer gradient curve is typically rather flat at lateral accelerations with low absolute values (e.g., for accelerations that are ≥−0.4 g and ≤0.4 g for most standard vehicles) and increases in value at high lateral accelerations.

A similar derivation may be used to determine a linear gain component ($gv_{ylin}$) for the lateral velocity of the vehicle in the linear region mode. As previously explained, it is sometimes helpful to generate a reference lateral velocity ($v_{yref}$). thus, exemplary method 100 may calculate this value using the following equation:

$$gv_{ylin} = g\gamma lin\left(b - \frac{aMV_x^2}{LC_r \text{sgn}(V_x)}\right) \quad \text{(Equation 5)}$$

It should be appreciated that Equations (3) and (5) take into consideration the direction of vehicle travel (i.e., forward or reverse) by using the sign of $V_x$. A positive sign may be assigned for forward travel and a negative sign for reverse travel, for example. Thus, method 100 is able to provide a reference yaw rate ($\gamma_{ref}$) for vehicles traveling in either forward or reverse directions.

Step 140 determines a non-linear component (sometimes referred to as the "non-linear gain") for the reference yaw rate ($\gamma_{ref}$). The non-linear component or non-linear gain ($g\gamma_{nonlin}$) is a portion of the reference yaw rate that generally corresponds to the non-linear behavior of the vehicle when it is in the linear region mode (i.e., non-linear behavior due to a non-constant understeer gradient). Determination of this value can be accomplished in a number of different ways, as step 140 is not constrained to any one particular embodiment. Unlike the linear gain ($g\gamma_{lin}$) solution, the understeer gradient ($K_u$) in step 140 is a non-linear function of the reference lateral acceleration and may be stored as a polynomial or a lookup table, to cite two possibilities. Since the reference lateral acceleration cannot be known until the understeer gradient ($K_u$) is known, and the understeer gradient ($K_u$) is a function of the reference lateral acceleration, a recursive solution may be used to solve this. A non-limiting example of a recursive solution that may be used is Equation (9) in U.S. Patent Application Publication No. 2009/0182476, which is already incorporated by reference. Generally, step 140 may use a recursive algorithm that: i) starts with a value for the reference lateral acceleration; ii) gets the understeer gradient ($K_u$) as a function of reference lateral acceleration (e.g., either through a fourth order polynomial or lookup table); iii) computes the non-linear yaw gain ($g\gamma_{nonlin}$) using Equation (9) of the '476 publication; iv) uses the non-linear yaw gain ($g\gamma_{nonlin}$) to compute a new reference lateral acceleration; v) combines the new value with the old one using a first-order digital filter (the rate of convergence may be controlled by chose of the digital filter constant); and vi) feeds back the filtered reference lateral acceleration to step ii). This recursive algorithm preferably converges on some value. Again, other approaches or techniques may be used by step 140 to determine non-linear gain ($g\gamma_{nonlin}$), as the preceding embodiment is just one possible example.

Step 150 determines adjusted front and rear steering angles ($\delta_{fadj}$ and $\delta_{radj}$). According to one exemplary embodiment, step 150 uses the effective front steering angle ($\delta_{feff}$), the rear steering angle ($\delta_r$), the yaw rate linear gain ($g\gamma_{lin}$), and the yaw rate non-linear gain ($g\gamma_{nonlin}$), all of which were generated in previous steps, to determine adjusted front and rear steering angles ($\delta_{fadj}$ and $\delta_{radj}$) using equations (6) and (7). One reason for providing adjusted front and rear steering angles ($\delta_{fadj}$ and $\delta_{radj}$) is to produce a non-linear yaw gain. As will be explained, a dynamic compensator subsequently imposes a linear yaw gain that needs to be removed; thus, adjusting these two angles in this manner prior to the dynamic compensator can accomplish this.

$$\delta_{fadj} = \frac{g\gamma nonlin}{g\gamma lin} \delta_{feff} \quad \text{(Equation 6)}$$

$$\delta_{radj} = \frac{g\gamma nonlin}{g\gamma lin} \delta_r \quad \text{(Equation 7)}$$

Again, $\delta_r$ may be used instead of an effective rear steering angle $\delta_{reff}$ since the range of a rear steer system is generally limited to small angles; therefore, the response is nearly linear. However, if large rear steer angles are used, or other conditions require, then $\delta_{reff}$ can be used instead. At this point, exemplary method 100 is ready to address the non-linear region component of the reference yaw rate calculation.

Step 160, which may be referred to as a dynamic compensator because it addresses certain aspects of dynamic behavior, estimates a yaw rate ($\gamma$) and a lateral velocity ($V_y$). In one exemplary embodiment, step 160 uses a two-wheel model (a so-called bicycle model), as opposed to a four-wheel model. The bicycle model is generally a linear model that starts with a four-wheel vehicle model, and then collapses the four-wheel model into a two-wheel model by setting the track width of the vehicle to zero. Thus, vehicle operating parameters for the front and rear axles may be lumped together. As an example, a front steering angle ($\delta_f$) may be a combination or an average of the steering angles from the front right and the front left wheels such that the combined steering angle is used in the two-wheel bicycle model; the same applies to the rear steering angle ($\delta_r$), as well other vehicle operating parameters. Skilled artisans will understand how to employ and use a bicycle model in the context of step 160.

Figure 3:
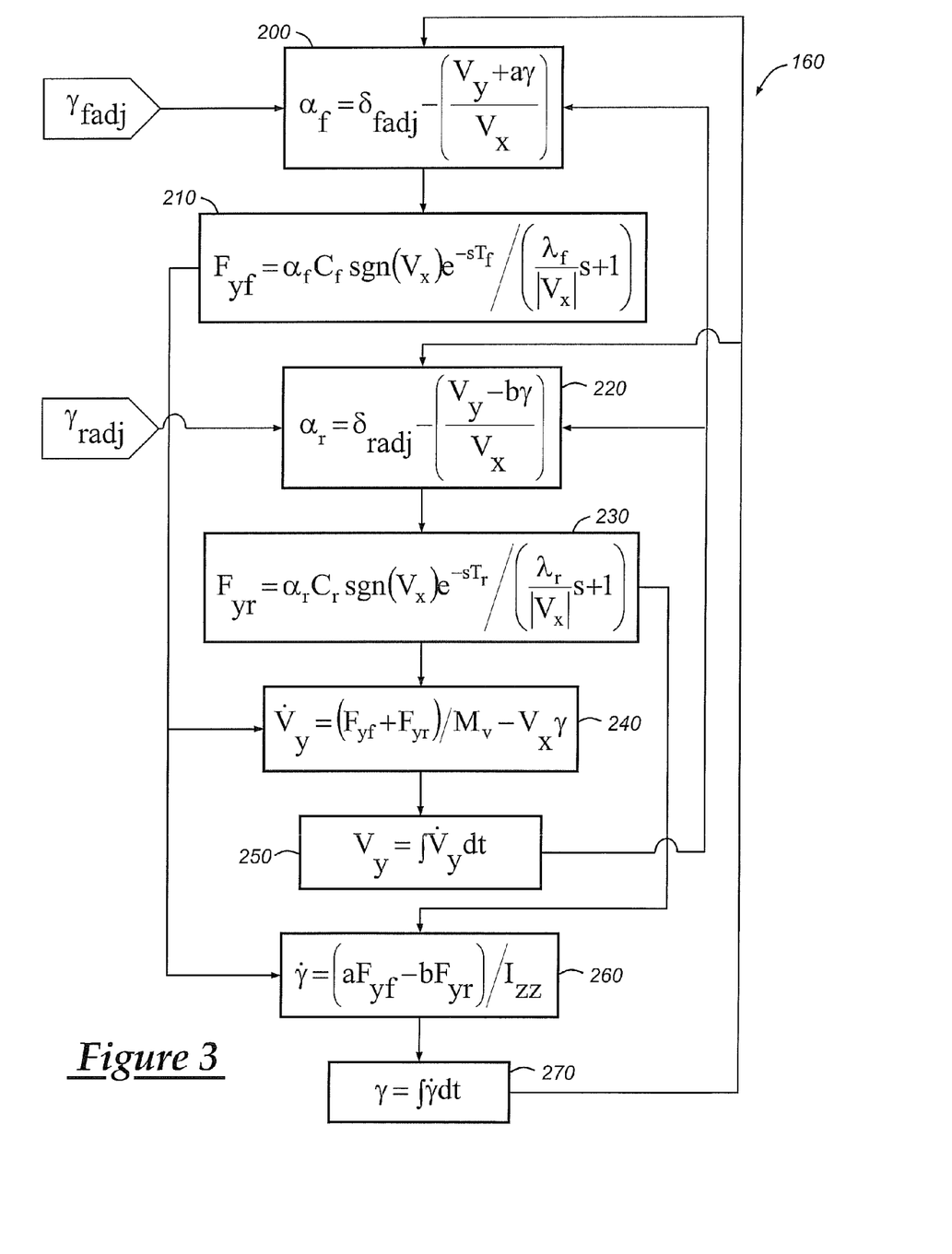
FIG. 3 is a flowchart of an exemplary dynamic compensator that may be used with the method of FIG. 2.

With reference to FIG. 3, there is shown an exemplary embodiment of step 160, which numerically integrates the bicycle model and uses the following inputs to do so: the adjusted front steering angle ($\delta_{fadj}$), the adjusted rear steering angle ($\delta^{radj}$), the yaw rate linear gain ($g_{\gamma lin}$), the yaw rate non-linear gain ($g_{\gamma nonlin}$), and the longitudinal velocity of the vehicle ($V_x$). Step 160 assumes that the tire lateral force is proportional to slip angle, where the proportionality constants are the cornering stiffnesses ($C_f$, $C_r$) mentioned above. Step 160 also assumes that given a steering input, the lateral force buildup is instantaneous. In order to simplify step 160 for purposes of illustration, it has been parsed into sub-steps 200-270 (although other combinations and sequences of sub-steps may be used instead).

Beginning with step 200, this step determines a front slip angle ($\alpha_f$) from the adjusted front steering angle ($\delta_{fadj}$), lateral velocity ($V_y$), distance (a) which is from the center of gravity to the front axle, yaw rate ($\gamma$), and signed longitudinal velocity ($V_x$) using Equation 8 below. Skilled artisans will appreciate that the values for the lateral velocity ($V_y$) and yaw rate ($\gamma$) may be provided to step 200 via a feedback loop.

$$\alpha_f = \delta_{fadj} - \left(\frac{V_y + a\gamma}{V_x}\right) \quad \text{(Equation 8)}$$

Next, step 210 determines a front lateral force ($F_{yf}$) from the recently calculated front slip angle ($\alpha_f$), front cornering stiffness ($C_f$), signed longitudinal velocity ($V_x$), front axle time delay ($T_f$), front relaxation length ($\lambda_f$), and complex frequency (s) (used in s-domain representations of dynamic functions). This calculation may be accomplished using equation 9 which, unlike previous models, uses tire dynamics that address how tire lateral forces build up as a function of time. The term "tire dynamics," as used herein, broadly refers to all tire characteristics or parameters that can describe certain aspects of tire behavior during operation. One example of a tire dynamic is the tire relaxation length ($\lambda$). For instance, Equation 9 takes into account the effects of tire relaxation length, which generally refers to the distance that a tire has to roll to reach 63.2 (1−1/e) percent of its full lateral force when a steering input is applied. This is implemented here with a generalized process or time delay, where ($T_f$) is a pure time delay for the front axle tires and ($\lambda_f$) is a front tire relaxation length in meters (m). Since the longitudinal velocity ($V_x$) is signed, the dynamic compensator accurately reflects the vehicle dynamics for both forward and reverse motion.

$$F_{yf} = \frac{\alpha_f C_f \operatorname{sgn}(V_x) e^{-sT_f}}{\left(\frac{\lambda_f}{|V_x|} s + 1\right)} \quad \text{(Equation 9)}$$

Step 220 then computes a rear slip angle ($\alpha_r$) from adjusted rear steering angle ($\delta_{radj}$), lateral velocity ($V_y$), distance (b) which refers to the distance from the center of gravity to the rear axle of the vehicle, yaw rate ($\gamma$), and signed longitudinal velocity ($V_x$). This computation may be performed using Equation 10. As with step 200, the values for the lateral velocity ($V_y$) and yaw rate ($\gamma$) may be provided to step 220 via a feedback loop.

$$\alpha_r = \delta_{radj} - \left(\frac{V_y - b\gamma}{V_x}\right) \qquad \text{(Equation 10)}$$

Step 230 determines a rear lateral force ($F_{yr}$) from rear slip angle ($\alpha_r$), rear cornering stiffness ($C_r$), signed longitudinal velocity sgn($V_x$), rear axle time delay ($T_r$), rear relaxation length ($\lambda_r$), and complex frequency (s) (used in s-domain representations of dynamic functions). Step 230 may use Equation (11), which is similar to Equation 9 in that it employs tires dynamics. In this case, Equation 11 takes into account tire dynamics by using ($T_r$) which is a pure time delay for the rear axle tires, and ($\lambda_r$) which is a rear tire relaxation length in meters (m).

$$F_{yr} = \frac{\alpha_r C_r \text{sgn}(V_x) e^{-sT_r}}{\left(\frac{\lambda_r}{|V_x|} s + 1\right)} \qquad \text{(Equation 11)}$$

Step 240 determines the lateral velocity derivative $\dot{V}_y$ from front lateral force ($F_{yf}$), rear lateral force ($F_{yr}$), total vehicle mass (M), signed longitudinal velocity ($V_x$), and yaw rate ($\gamma$), and may do so using Equation (12).

$$\dot{V}_y = (F_{yf} + F_{yr})/M - V_x \gamma \qquad \text{(Equation 12)}$$

At this point step 250 is ready to determine the lateral velocity ($V_y$) as the integral of the lateral velocity derivative $\dot{V}_y$. Equation (13) may be used for this purpose. As mentioned above, lateral velocity ($V_y$) is one of the desired outputs of step 160 and will be provided to downstream steps or calculations for further processing.

$$V_y = \int \dot{V}_y dt \qquad \text{(Equation 13)}$$

Step 260 determines the yaw rate derivative $\dot{\gamma}$ from the front lateral force ($F_{yf}$) which was calculated in step 210, distance (a) which is the distance from the center of gravity to the front axle, rear lateral force ($F_{yr}$) which was determined in step 230, distance (b) which represents the distance from the center of gravity to the rear axle, and vehicle moment of inertia about the z axis ($I_{zz}$). Equation (14) may be used to make this calculation.

$$\dot{\gamma} = (aF_{yf} - bF_{yr})/I_{zz} \qquad \text{(Equation 14)}$$

Step 270 then calculates the yaw rate ($\gamma$) as the integral of yaw rate derivative $\dot{\gamma}$, and may do so using Equation (15). This too is one of the desired outputs of step 160 and will be provided to downstream steps or calculations for further processing.

$$\gamma = \int \dot{\gamma} dt \qquad \text{(Equation 15)}$$

Those skilled in the art will appreciate that any number of different techniques can be used for the numerical integration functions (e.g., Equations 13 and 15). This includes, for example, Euler's method. It is also possible to solve the various discrete equations, which may result in a fourth order transfer function in the z-domain. Polynomial coefficients for this transfer function can be stored in tables in memory 70 for example. While such an approach may prove to be more efficient computationally, the tables needed for this approach may require a significant amount of memory to store.

Furthermore, method 160 can be used for low or high vehicle speeds. Put differently, the dynamic compensator in step 160 may operate in one of two different modes: a low-speed mode or a high-speed mode. At very low speeds (e.g., less than 2 m/sec), the dynamic compensator response can become highly oscillatory and underdamped, not representing the actual vehicle dynamics. Thus, in a low-speed mode, the integrators in Equations 13 and 15 may be forced to the steady state values of lateral velocity and yaw rate, respectively. This results in a steady state lateral velocity ($V_{yss}$) that can be used to reset the integrator in Equation 13 as follows:

$$V_{yss} = g_{v_{ylin}}(\delta_{fadj} - \delta_{radj}) \qquad \text{(Equation 16)}$$

Similarly, Equation 15 may become expressed as Equation 17 so that the steady state yaw rate $\gamma_{ss}$ is as follows:

$$\gamma_{ss} = g_{\gamma lin}(\delta_{fadj} - \delta_{radj}) \qquad \text{(Equation 17)}$$

Even though method 100 may employ some parts of the bicycle model, it also takes into consideration the effect of tire relaxation length, which provides for more accurate and robust estimates for the reference yaw rate and the reference lateral velocity.

Turning back to FIG. 2, the yaw rate $\gamma$ and lateral velocity $V_y$ estimates that were generated in the previous step may now be provided to step 170 which can take into account the effect of banked or sloped road surfaces. However, when a vehicle is driven on a banked surface, additional steer angle ($\delta$) input may be needed to provide one or more additional lateral forces needed to maintain a desired vehicle path. This additional steer angle ($\delta$) input may result in an additional yaw rate and lateral acceleration, which should be removed from the reference yaw rate and reference lateral velocity. Step 170, also referred to as a bank compensator, may first determine a gravitational component of the lateral acceleration ($a_{ygrav}$) of the vehicle, per equation 18.

$$a_{ygrav} = a_y - V_x \gamma \qquad \text{(Equation 18)}$$

In addition, the gravitational component of the lateral acceleration $a_{ygrav}$ may be filtered to determine a more accurate value. In one embodiment, the gravitational component of the lateral acceleration $a_{ygrav}$ is filtered with a first order filter to determine a filtered lateral acceleration $a_{ygravfilt}$. Then, the compliance steer needed is expressed in equation 19 as shown below.

$$\delta_{bank} = a_{ygravfilt} K_u \qquad \text{(Equation 19)}$$

The yaw rate bank compensation can then be determined as shown in equation 20.

$$\gamma_{bank} = g_{\gamma nonlin} \delta_{bank} \qquad \text{(Equation 20)}$$

where $\gamma_{bank}$ is subtracted from $\gamma$ of equation 15 to determine the reference yaw rate ($\gamma_{ref}$). Similarly, the lateral velocity bank compensation is determined as expressed in equation 21 shown below.

$$V_{ybank} = \gamma_{bank}\left(b - \frac{aMV_x^2}{LC_r \text{sgn}(V_x)}\right) \qquad \text{(Equation 21)}$$

Then, $V_{ybank}$ is subtracted from $V_y$ of equation 13 to determine the reference lateral velocity ($V_{yref}$). Determining a bank compensation is optional and is not required of method 100.

The reference yaw rate ($\gamma_{ref}$) and/or the reference lateral velocity ($V_{yref}$) may then be used by vehicle chassis control system 12 to control one or more actuators around the vehicle. For example, the reference yaw rate ($\gamma_{ref}$) may be used by chassis control system 12 to generate control signals that are sent to one or more actuators in the vehicle brake system (e.g., brake units 40-46). These actuators may then modulate or otherwise manipulate the applied brake force so that the yaw rate of the vehicle is influenced. In one embodiment, vehicle chassis control system 12 uses closed-loop feedback to drive the actuators in a manner that seeks to minimize the yaw rate error ($\Delta\gamma_{error}$). Other uses, applications and/or implementations of the reference yaw rate ($\gamma_{ref}$) and/or the reference lateral velocity ($V_{yref}$) are certainly possible, as the preceding example is only one possibility.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the specific combination and order of steps is just one possibility, as the present method may include a combination of steps that has fewer, greater or different steps than that shown here. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A method for determining a reference yaw rate ($\gamma_{ref}$) for a vehicle, comprising the steps of:
   (a) determining a steering angle ($\delta$);
   (b) determining a longitudinal velocity ($V_x$); and
   (c) using a control unit in conjunction with the steering angle ($\delta$), the longitudinal velocity ($V_x$), and one or more tire dynamic(s) to determine the reference yaw rate ($\gamma_{ref}$) for the vehicle, wherein the tire dynamic(s) refer to tire characteristics or parameters that address a buildup in tire forces as a function of time and the reference yaw rate ($\gamma_{ref}$) generally corresponds to the ideal yaw rate of the vehicle if the vehicle was driven on a high-coefficient surface.

2. The method of claim 1, where step (a) further comprises determining a steering angle ($\delta$) by receiving a steering signal from a steering sensor mounted in the vehicle.

3. The method of claim 1, wherein step (a) further comprises determining a front steering angle ($\delta_f$) and a rear steering angle ($\delta_r$), and step (c) further comprises using the front steering angle ($\delta_f$), the rear steering angle ($\delta_r$), the longitudinal velocity ($V_x$), and the tire dynamic(s) to determine the reference yaw rate ($\gamma_{ref}$) for a vehicle that includes steerable rear wheels.

4. The method of claim 1, wherein step (a) further comprises determining an effective steering angle ($\delta_{eff}$) with a steering response that has already been linearized to at least partially compensate for a non-linear steering response, and step (c) further comprises using the effective steering angle ($\delta_{eff}$), the longitudinal velocity ($V_x$), and the tire dynamic(s) to determine the reference yaw rate ($\gamma_{ref}$).

5. The method of claim 4, wherein step (a) further comprises determining the effective steering angle ($\delta_{eff}$) by using a look-up table, a measured steering angle ($\delta_{meas}$) is an input of the look-up table, a correction factor (K) is an output of the look-up table, and the effective steering angle ($\delta_{eff}$) is determined according to the equation $\delta_{eff} = K\delta_{meas}$.

6. The method of claim 1, where step (b) further comprises determining a longitudinal velocity ($V_x$) by receiving a vehicle speed signal from one or more vehicle speed sensor(s) mounted in the vehicle.

7. The method of claim 1, wherein step (c) further comprises using the steering angle ($\delta$) and the longitudinal velocity ($V_x$) to determine a yaw rate linear gain ($g\gamma_{lin}$) and a yaw rate non-linear gain ($g\gamma_{nonlin}$), and using the yaw rate linear gain ($g\gamma_{lin}$) and the yaw rate non-linear gain ($g\gamma_{nonlin}$) to determine the reference yaw rate ($\gamma_{ref}$) for a vehicle that is traveling in either forward or reverse directions.

8. The method of claim 7, wherein the yaw rate linear gain ($g\gamma_{lin}$) is determined according to the equation:

$$g\gamma lin = \frac{V_x}{L + K_u V_x^2 \operatorname{sgn}(V_x)}$$

where $V_x$ is the vehicle longitudinal velocity (m/sec), L is the vehicle wheel base (m), and $K_u$ is the understeer gradient (radian/g).

9. The method of claim 1, wherein step (c) further comprises using an effective steering angle ($\delta_{eff}$) with a steering response that has already been linearized to at least partially compensate for a non-linear steering response, a yaw rate linear gain ($g\gamma_{lin}$), and a yaw rate non-linear gain ($g\gamma_{nonlin}$) to determine an adjusted steering angle ($\delta_{adj}$), and using the adjusted steering angle ($\delta_{adj}$), the longitudinal velocity ($V_x$), and the tire dynamic(s) to determine the reference yaw rate ($\gamma_{ref}$).

10. The method of claim 9, wherein the adjusted steering angle ($\delta_{adj}$) is determined according to the equation:

$$\delta_{adj} = \frac{g\gamma nonlin}{g\gamma lin} \delta_{eff}$$

where ($g\gamma_{nonlin}$) is the yaw rate non-linear gain, ($g\gamma_{lin}$) is the yaw rate linear gain, and ($\delta_{eff}$) is the effective steering angle.

11. A method for determining a reference yaw rate ($\gamma_{ref}$) for a vehicle, comprising the steps of:
   (a) determining an adjusted steering angle ($\delta_{adj}$);
   (b) determining a longitudinal velocity ($V_x$); and
   (c) using a control unit in conjunction with the adjusted steering angle ($\delta_{adj}$), a yaw rate linear gain ($g\gamma_{lin}$), a yaw rate non-linear gain ($g\gamma_{nonlin}$), the longitudinal velocity of the vehicle ($V_x$), and one or more tire dynamic(s) with a dynamic compensator to determine the reference yaw rate ($\gamma_{ref}$), wherein the dynamic compensator is based on a linear bicycle model and the reference yaw rate ($\gamma_{ref}$) generally corresponds to the ideal yaw rate of the vehicle if the vehicle was driven on a high-coefficient surface.

12. The method of claim 11, wherein the dynamic compensator uses the adjusted steering angle ($\delta_{adj}$) and the longitudinal velocity of the vehicle ($V_x$) to determine a slip angle ($\alpha$).

13. The method of claim 12, wherein the dynamic compensator uses the slip angle ($\alpha$), a cornering stiffness (C), the longitudinal velocity of the vehicle (Vx), a time delay (T), and a relaxation length ($\lambda$) to determine a lateral force (Fy).

14. The method of claim 13, wherein the lateral force ($F_y$) is determined according to the equation:

$$F_y = \frac{\alpha C \operatorname{sgn}(V_x) e^{-sT}}{\left(\frac{\lambda_r}{|V_x|} s + 1\right)}.$$

15. The method of claim 14, wherein the dynamic compensator uses the lateral force ($F_y$) and the longitudinal velocity of the vehicle ($V_x$) to determine a yaw rate derivative $\dot{\gamma}$.

16. The method of claim 15, wherein the dynamic compensator integrates the yaw rate derivative $\dot{\gamma}$ to determine the reference yaw rate ($\gamma_{ref}$).

17. The method of claim 11, wherein the dynamic compensator has a low-speed mode that generates a steady state yaw rate ($\gamma_{ss}$) for a vehicle that is traveling at very low speeds.

18. The method of claim 1, further comprising the steps of:
determining a gravitational component of a lateral acceleration ($a_{ygrav}$) of the vehicle and using the lateral acceleration ($a_{ygrav}$) to determine a yaw rate bank compensation ($\gamma_{bank}$); and
subtracting the yaw rate bank compensation ($\gamma_{bank}$) from a yaw rate estimate ($\gamma$) to arrive at the reference yaw rate ($\gamma_{ref}$).

19. The method of claim 1, further comprising the step of:
determining a reference lateral velocity ($V_{yref}$), wherein the reference lateral velocity ($V_{yref}$) generally corresponds to the ideal lateral velocity of the vehicle if the vehicle was driven on a high-coefficient surface.

20. The method of claim 1, further comprising the steps of:
using the reference yaw rate ($\gamma_{ref}$) to generate one or more control signal(s);
sending the control signal(s) from a vehicle chassis control system to one or more actuator(s); and
controlling the actuator(s) with the control signal(s) such that the actuator(s) influence the yaw rate of the vehicle.

21. A method for determining a reference yaw rate ($\gamma_{ref}$) for a vehicle, comprising the steps of:

(a) using a steering angle ($\delta$) and a longitudinal velocity ($V_x$) to determine a slip angle ($\alpha$);
(b) using the slip angle ($\alpha$) and one or more tire dynamic(s) to determine a lateral force ($F_y$) as a function of time;
(c) using the lateral force ($F_y$) as a function of time and the longitudinal velocity of the vehicle ($V_x$) to determine a yaw rate derivative $\dot{\gamma}$; and
(d) integrating the yaw rate derivative $\dot{\gamma}$ to determine the reference yaw rate ($\gamma_{ref}$), wherein the reference yaw rate ($\gamma_{ref}$) generally corresponds to the ideal yaw rate of the vehicle if the vehicle was driven on a high-coefficient surface, and at least one of the steps (a)-(d) is performed with a control unit located on the vehicle.

22. The method of claim 21, wherein step (b) further comprises using one or more tire dynamic(s) selected from the group consisting of: a cornering stiffness (C), a time delay (T), or a relaxation length ($\lambda$).

23. A chassis control system for a vehicle, comprising:
a steering sensor providing a steering signal that is representative of a steering angle ($\delta$);
one or more vehicle speed sensor(s) providing a vehicle speed signal that is representative of a longitudinal velocity ($V_x$);
a control unit receiving the steering signal from the steering sensor and the vehicle speed signal from the vehicle speed sensor(s), and providing a yaw rate control signal; and
one or more actuator(s) receiving the yaw rate control signal from the control unit and using the yaw rate control signal to influence the yaw rate of the vehicle, wherein the control unit uses the steering angle ($\delta$), the longitudinal velocity ($V_x$), and one or more tire dynamic(s) that refer to tire characteristics or parameters that address a buildup in tire forces as a function of time to determine a reference yaw rate ($\gamma_{ref}$) that generally corresponds to the ideal yaw rate of the vehicle if the vehicle was driven on a high-coefficient surface, and the control unit uses the reference yaw rate ($\gamma_{ref}$) to generate the yaw rate control signal.

24. The method of claim 1, wherein step (c) further comprises using one or more tire dynamic(s) selected from the group consisting of: a cornering stiffness (C), a time delay (T), or a relaxation length ($\lambda$).

* * * * *